INVENTOR.
John J. Sowko
BY Green, McCallister & Miller
HIS ATTORNEYS

Oct. 10, 1967  J. J. SOWKO  3,345,734
METHOD OF MAKING A SHAPED WEAR-RESISTANT COMPOSITE
Filed Jan. 13, 1965  3 Sheets-Sheet 2

INVENTOR.
John J. Sowko
BY Green, McCallister & Miller
HIS ATTORNEYS

Oct. 10, 1967  J. J. SOWKO  3,345,734
METHOD OF MAKING A SHAPED WEAR-RESISTANT COMPOSITE
Filed Jan. 13, 1965  3 Sheets-Sheet 3
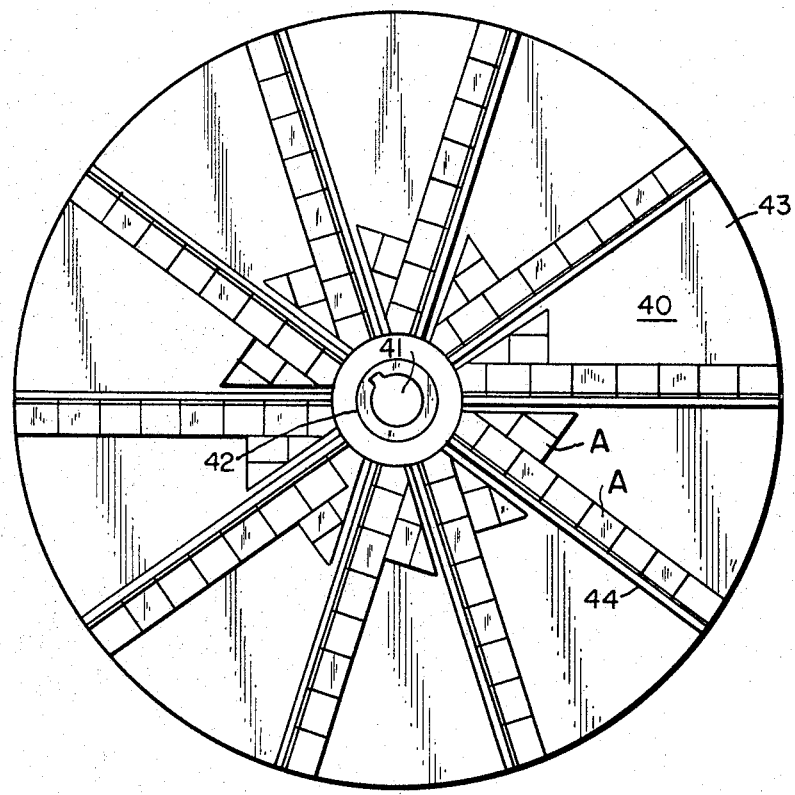
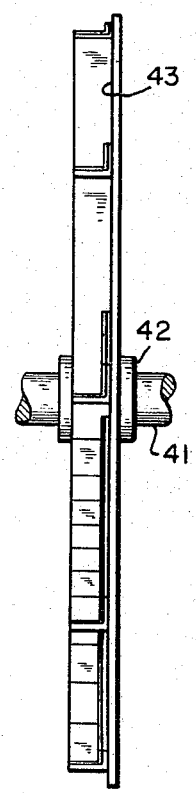
Fig. 11  Fig. 12
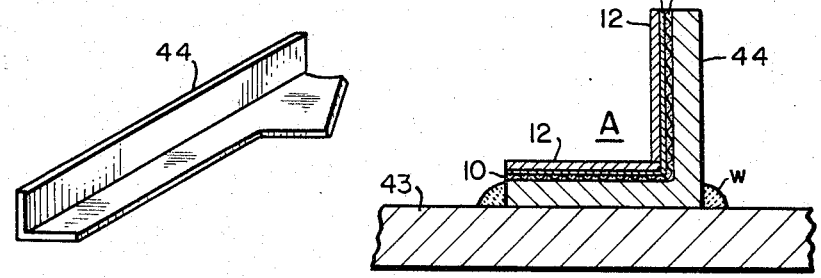
Fig. 13  Fig. 14
INVENTOR.
John J. Sowko
BY Green, McCallister & Miller
HIS ATTORNEYS United States Patent Office 3,345,734
Patented Oct. 10, 1967

3,345,734
METHOD OF MAKING A SHAPED
WEAR-RESISTANT COMPOSITE
John J. Sowko, Pittsburgh, Pa., assignor to Firth Sterling, Inc., Pittsburgh, Pa., a corporation of Pennsylvania
Filed Jan. 13, 1965, Ser. No. 425,145
17 Claims. (Cl. 29—471.1)

ABSTRACT OF THE DISCLOSURE

A composite wear-resistant member is provided which is suitable for use in a sandslinger and other apparatus requiring an abrasive and wear-resistant surface. Carbide metal is hard and wear resistant but inherently lacks tensile strength and flexibility, such that it is not practical to endeavor to use a single carbide metal member for the product. The problem is met by providing a ferrous metal screen of a dimension of the metal member product to be produced, placing a plurality of substantially flat carbide metal pieces in an edge abutting and surface aligned relation with each other on an exposed surface of the screen, and then metal brazing the carbide metal pieces along their undersides to the screen and flowing brazing metal into and filling up the joints between the pieces. This enables the provision of a shaped unitary wear resistant surface without interstices therebetween. A metal backing of open pattern and of good tensile strength and that has an inherent flexibility, such as of expanded metal, is employed to support the screen along its underside and brazing metal is also applied in such a manner as to braze the backing member to the screen. If desired, for a particular application, a cement-impregnated fabric material may be cemented on the backing member over the openings therein to provide a continuous surface where, for example, adjusting pressure, as in a sandslinger, is to be applied thereto. As an alternate in the process, a layer of brazing metal in sheet form may be placed between the carbide metal pieces and the screen and brazing heat applied. A resistant composite product is thus provided, made up of a continuous surface representing the carbide metal pieces and the brazing metal between their joints, and a metal backing member which has a good tensile strength for supporting the abrasive surface under the work usage to which the composite member product is to be employed.

---

This invention relates to a composite wear or abrasion resistant product which is suitable for applications where strength as well as wear resistance are important. A phase of the invention deals with a new and improved procedure for applying wear resistant carbide metal pieces to a supporting and strengthening backing member or member assembly.

There is a present-day need for members of different shapes and sizes that will be practical as wear resistant members, which can be readily and effectively formed for various fields of application, and which have sufficient strength for such fields of application. It is well known that carbide metal has excellent wear and abrasion resistance properties and is superior in this connection to ordinary metals and alloys. However, it has little flexibility and tensile strength and the size and form of metal pieces of such material are more or less limited by manufacturing equipment and procedures. Wear resistant members have many fields of application, such as in crushers, chutes, plow blades and particularly in sandslingers. Representative U.S. Patents No. 2,942,335, No. 2,942,971, No. 2,285,909 and No. 1,937,185 indicate the general nature of carbide metals, and No. 2,120,562 and No. 2,018,752 emphasize their hard but somewhat brittle or non-flexible characteristics.

In a sandslinger, conditions are particularly critical, in that the impeller cup or tip has a very slight clearance spacing, for example about .0020 of an inch, with respect to the opposed surface of the arcuate member along which it is adapted to turn or rotate within a suitable housing. In such a field of use, a good quality steel plate member will last only about one hour, whereas it has been found that carbide will last for 800 to 900 hours or more, as subjected to sand abrasion. In such use, an impeller tip liner which is carried by the housing is the member which has to withstand a continued abrasing action of the sand particles. Construction of such a member is complicated by the fact that it is of arcuate shape.

Since carbide pieces can only, under present manufacturing procedures, be produced in sizes up to about 1 by 1½ inches with a maximum thickness of about $\frac{1}{32}$ of an inch, and most economically as flat or planar pieces, it is apparent that to use carbide, it is necessary to provide a member made up of a patterned layer of carbide pieces of a size such that the desired contour of the liner member can be attained. I have determined that in this and other fields of utilization, it is important to close-off or fill-up the spacing or joints between adjoining edges of the pieces with metal, in that the sand will otherwise tend to wash-out such edges or joints to produce a fluttering of the impeller cup.

Also, I have found that there is a problem involved from the standpoint of mounting carbide pieces as a composite member assembly without damaging them, and in such a manner that they will withstand the high temperatures of a particular utilization and will not fail due to the inherent lack of strength (relatively brittle nature) of the carbide. In this connection, although it appears logical to apply carbide pieces to a steel backing member, for example, difficulty has been encountered in obtaining a complete and effective bond, while also filling up the joint spaces between the carbide pieces, and without causing breakage of the carbide pieces during the securing operation. That is, a solid metal piece, such as of steel, if used as a backing member, has an entirely different coefficient of expansion and contraction than the carbide metal and thus, will tend to cause movement between the backing metal piece or member and the carbide pieces and not only produce a warping effect, but tend to cause a breakage of the pieces. By way of example, carbide metal may have a coefficient of expansion of about ⅓ to ½ that of steel.

Also, difficulty is encountered in brazing or welding the carbide pieces to provide an accurate, smooth and continuous inner surface or face along the carbide metal layer which is necessary in a limited clearance spacing application, such as in a sandslinger. I have also discovered that if an attempt is made to use mica for bonding the carbide pieces to a metal backing piece or member, that openings are left along the edges or joints between the carbide metal and a strong joint cannot be obtained. On the other hand, I found that it is difficult if not impossible to braze two different metals, such as a carbide piece assembly, to a solid metal backing member due to the differences in their coefficients of expansion.

Thus, it has been an object of my invention to devise a new and improved form of composite metal product or member construction in which carbide metal pieces form the wearing surface, and which may be provided in any desired shape and that will solve the problem above-outlined;

Another object of my invention has been to devise a new and improved procedure for making a composite metal product of a desired shape for abrasive utilizations;

Another object of my invention has been to solve the problem presented in this particular art after a full determination of the factors and requirements involved, and on the basis of a novel discovery as to how to fully meet them;

A further object of my invention has been to form a strong, molecularly-bonded composite metal product which makes use of a group or multiplicity of carbide metal pieces, which makes possible close clearance tolerances on the wearing side of the product, and which can be also produced effectively and efficiently without danger of warpage and with a minimization of rejects;

These and other objects of my invention will appear to those skilled in the art from the description thereof and the illustrated embodiments.

Figure 1:
FIGURE 1 is a side perspective in elevation illustrating a preliminary step in forming a composite product, such as a sandslinger wear plate, in accordance with my invention.
Figure 6:
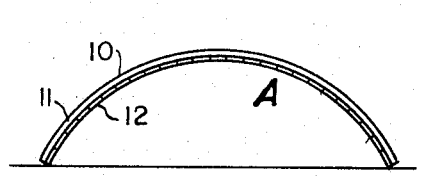
FIGURE 6 is a side view in elevation of a wear plate composite construction produced in accordance with my invention, after the metal members have been bonded together as by brazing in accordance with the step of FIGURE 5.
Figure 7:
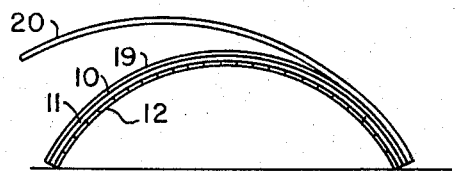
Figure 8:
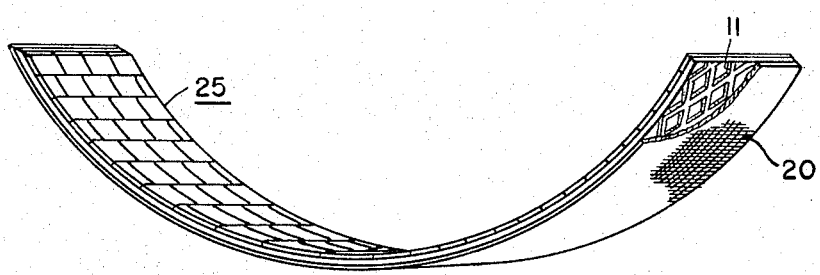
Figure 9:
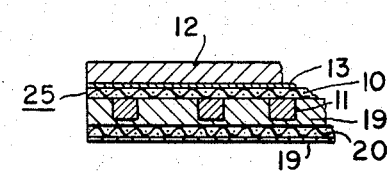
Figure 10:
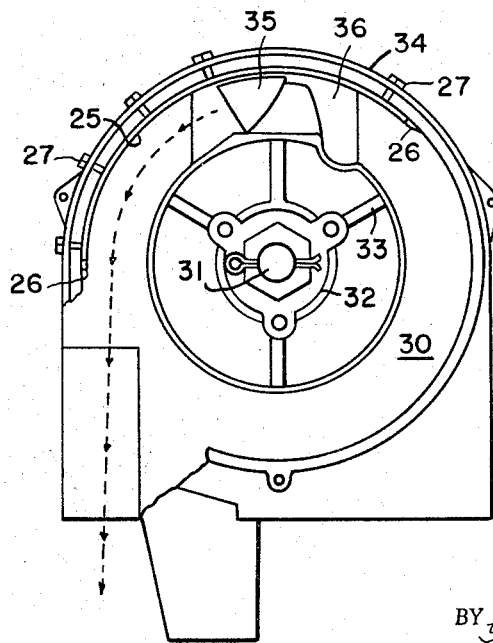

FIGURE 7 is a view similar to and on the scale of FIGURE 6 showing a further step of providing a cement and fabric backing layer on the product of FIGURE 6 so as to produce the product of FIGURES 8 and 9; FIGURES 6 and 7 are on a reduced scale with respect to FIGURES 1 and 8;

FIGURE 8 is an enlarged side perspective view on the scale of FIGURE 1, with the wear side turned upwardly, as distinguished from FIGURES 6 and 7, and showing the composite product produced by the step of FIGURE 7; in this figure, the right-hand portion of the product is broken-away to better show the layer construction thereof;

FIGURE 9 is an enlarged fragmental cross-section in elevation taken through the product of FIGURE 8;

FIGURE 10 is a somewhat diagrammatic side view in elevation illustrating the employment of a product represented by FIGURES 8 and 9 as a wear plate in a sandslinger apparatus;

FIGURE 11 is a top plan view of an abrading rotor wheel illustrating a further application or use of a composite product produced in accordance with my invention;

FIGURE 12 is an end view in elevation on the scale of and of the rotor wheel of FIGURE 11;

FIGURE 13 is a side elevation on the scale of FIGURES 11 and 12 showing the construction of radially-positioned angle pieces used in the rotor wheel construction of FIGURES 11 and 12; and FIGURE 14 is a greatly enlarged fragmental section in elevation illustrating the positioning of a composite product of my invention along the inside of an angle piece, such as shown in FIGURE 13.

I have discovered that all the factors involved in the problem above-presented may be solved by making a composite member product which utilizes a metal backing member 11 or 11' which is essentially strong in the sense of tensile strength, and that serves for mounting the product, but which additionally has an inherent flexibility, such as presented in an expanded metal member or part or in a perforated metal part or member and preferably, the former. An intermediate member or part 10 of the nature of a heat-resistant, flexible metal screen material, such as of stainless steel, that will withstand high temperatures involved in a brazing or welding operation, is employed as a facing member or part for the backing member or part. Finally, carbide metal pieces 12 and 12', for example pressed-out rectangular pieces of flat shape, are then placed in an edge-abutting relationship or cover pattern upon the outer face of the screen member or part, and the assembly is welded or brazed in such a manner that brazing metal 13 fully fills and secures the interstices or joints between the edges of adjacent carbide metal pieces, and additionally secures the carbide pieces to the intermediate member or part as well as to the backing-up layer or part.

The openings in the intermediate and backing metal members not only facilties obtaining a full molecular adherency between the members of the composite structure, but also make possible the joining of the members without distorting a preliminary shaping of the backing and intermediate members, warpage of the assembly, or breakage of the carbide metal pieces. A full accurate alignment of the carbide metal pieces is obtained from the standpoint of the wear and abrasion resistant outer or exposed face or surface which they present in their patterned assembled and molecularly bonded relation.

Using such an assembly, I can readily and effectively apply brazing metal between the under faces of the carbide metal layer and the intermediate or screen member layer, so that when the brazing metal is softened, it will flow along and fill the joints between the carbide pieces, as by capillary action. The composite thus produced has an accurate shape, as based upon a pre-formed shaping of the intermediate and backing members or parts, and has a strength that could be approached by a solid metal backing member, if it were practical to secure carbide pieces thereto.

Where the composite structure, as thus produced, is to be used in certain applications, such as in the sandslinger, I have found it is desirable to provide the backing member 11 or 11' with a suitable backing face against which adjustment screws 27 (see FIGURE 10) can be applied without regard to the openings or spaces in such member and, in this connection, I apply a hard cement or silicate layer 19 to the backing member and bond a suitable woven fabric material 20, such as of nylon, to such layer by soaking it with the same cement material and cementing it to the layer.

FIGURE 1 shows a preliminary step in forming a wear plate, such as used in a sandslinger apparatus of FIGURE 10, in accordance with which a perforated, expanded metal member or piece 11, and a metal screen 10 are placed in a face-abutting, aligned, back-to-back relation, and shaped to substantially the desired shape of the finished product. In this connection, the side and end edges of the members or pieces 10 and 11 are aligned and are then bent or formed into the desired shape. The length of the shape may be the length of the desired product or some multiple of the desired product, such as a half of it. In the latter event, the preliminary shape will then be cut to the desired length.

Figures 2, 2A:
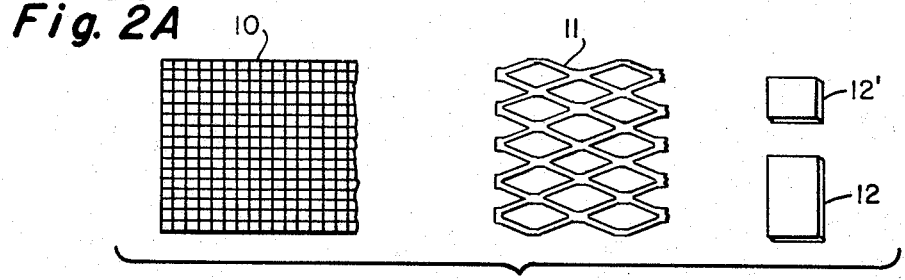
FIGURE 2 is a fragmental exploded plan view showing metal elements or parts which may be used in forming a composite product in accordance with my invention.
FIGURE 2A is a fragmental plan view of a modified form of backing element that may be used for one of the elements of FIGURE 2.

In FIGURE 2, I have shown metal members which comprise a product assembly employed in a preliminary step of the operation. In this connection, a stainless steel wire mesh screen member 10, for example of 20–20 mesh with .0068 of an inch wire diameter, is adapted to be placed over a base metal member 11 or 11' which may be of expanded steel or perforated metal construction. The thickness of the back member 11 or 11' may be about twice or three times the thickness of the screen member 10. The mesh of the screen member 10 may be any suitable mesh, such as a conventional size mesh used for door or window screen usage. In FIGURE 2, I have also shown representative carbide metal pieces, such as 12 and 12', which may be of a conventional carbide composition and which are formed in suitable flat or planar rectangles or squares. By way of example, I have successfully employed a perforated metal member 11' of cold rolled steel of ⅛ of an inch in thickness, of ⅜ of an inch diameter, punched holes, in straight or staggered relation, with 9/16 of an inch centers. I have also employed .0375 of an inch thickness of an expanded steel member 11 with ¼ of an inch hole size and ½ of an inch hole size, and a member of .050 of an inch thickness with ⅜ of an inch holes or open portions.

Figure 3:
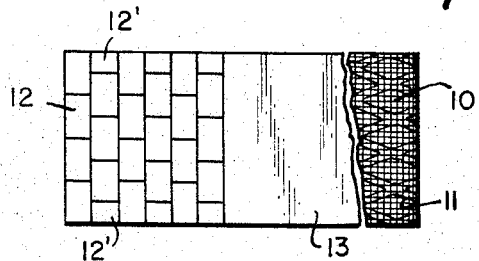
FIGURE 3 is a somewhat diagrammatic plan view on a reduced scale with respect to FIGURE 2, illustrating an assembled part or element relationship, with a brazing metal layer, and with portions of metal member layers removed to show their mounting.

The carbide elements or parts are to be placed in a close edge-to-edge pattern on the upper face of the screen member or layer 10 so as to cover it. They may be placed in a symmetrical pattern or in a staggered pattern, such as illustrated by the arrangement of the elements 12 and 12' of FIGURE 3. The carbide layer represented by the elements 12 and 12' of FIGURE 3 is welded or brazed in forming the composite product by the application of brazing metal 13, see FIGURE 4. The brazing metal 13 is preferably applied in thin sheet form as a layer, see FIGURE 13 or it may be applied in melted form by a torch after the carbide elements are placed in position by turning the assembly over so as to introduce the brazing metal through the interstices of the layer 11 and the interstices of the layer 10 to the underside of the layer made-up of the carbide elements, such as 12 and 12'. In the latter type of approach, I have found that it is advisable to first torch-apply brazing metal through the screen with the backing member removed and to then, after the backing member has been placed in position, again apply the torch, with or without additional brazing metal, through the openings in the backing metal member. The backing metal member will be provided with the desired shape of the product to be produced before it is brazed in position, in order that the flexible screen and the carbide layers may be conformed to the desired shape when they are secured or bonded to the backing member. To provide a uniform bonding of the members of the composite of FIGURES 3 and 4, I have shown a furnace 17 in FIGURE 5 through which the composite may be passed so as to remelt the brazing metal and force it upwardly along the side and end edges or joints of adjacent carbide elements, and to substantially fill the interstices of the screen layer 10. In this manner, I can produce a composite carbide layer whose joints are fully filled-up to the planar outer surface of the elements along their joining edges.

Figure 4:
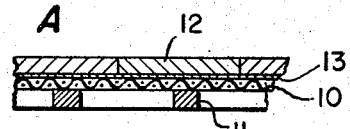
FIGURE 4 is a greatly enlarged side section fragment showing the assembly of FIGURE 3.

As shown in FIGURES 3 and 4, I prefer to use one or more solids, shim-like, brazing metal sheets 13 of a commercial brazing metal composition, of about .010 to .015 of an inch in thickness, as a layer between the layer of carbide metal pieces 12 and 12' and the wire mesh member or layer 10. Usually about two or three of the brazing metal sheets are sufficient. The assembly may then be molecularly bonded together by placing it within forms 12 and 15, and either applying melting heat in a furnace 17 of FIGURE 5, or applying induction heating by means of imbedded electric coils 18' and 18", as illustrated in FIGURE 5A. An effective brazing metal is a nickel-silver alloy, although any of the brazing alloys having melting points of about 1200 to 1500° F. may be employed. The temperature of the furnace 17 may be heated to about 2050° to 2300° F. and the cart then removed. The bond is obtained by an interdiffusion or alloying, without melting the metal of the carbide, the screen or the backing metal layers.

Figure 5:
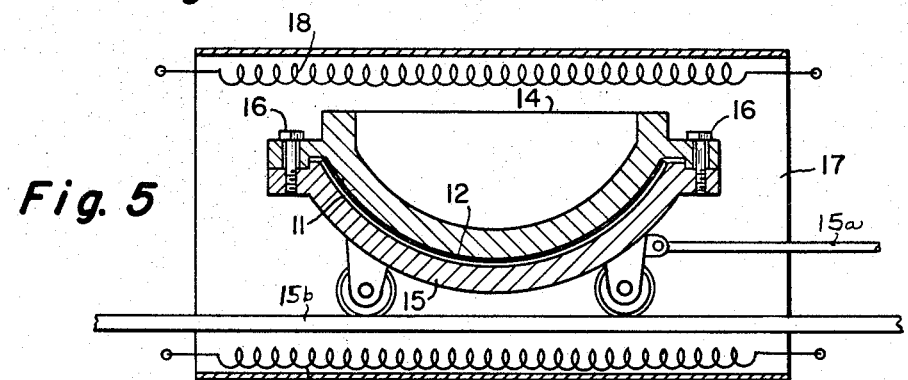
FIGURE 5 is a side section in elevation illustrating a step in the operation of bonding metal members or parts of the composite assembly to form a unitary member product.
Figure 5A:
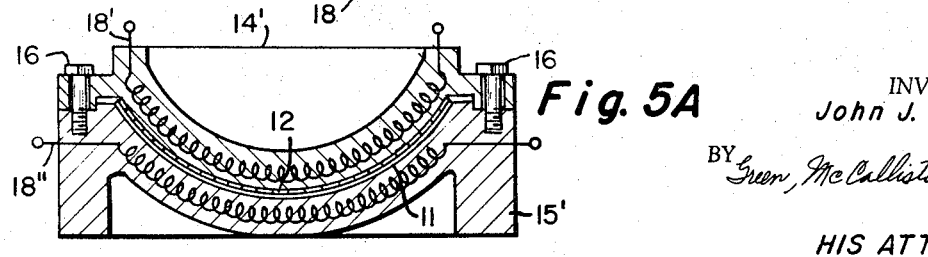
FIGURE 5A is a view on the scale of and corresponding to FIGURE 5 showing a modified form of apparatus for accomplishing the step of FIGURE 5.

I have discovered that the use of a flexible screen layer 10 as the immediate bonding layer for the layer of carbide pieces 12 and 12', enables the obtaining of a full molecular bond between such layers and the backing layer 11, without any tendency for the carbide layer to distort the original shaping, to break away from the steel metal layers, or for the composite to warp out of the original preliminary shaping of the members 10 and 11, as accomplished by the step of FIGURE 1, or as may be later accomplished by the clamping mold assemblies of FIGURES 5 and 5A.

Merely by way of illustration, in FIGURE 5, I have shown a clamping mold cart 15 whose shape corresponds to the desired shape of the product and within which the composite assembly of FIGURE 4 is placed. The assembly may be held in a clamped or pressed relation by a complementary top clamping or mold member 14 and clamping bolts 16. The furnace or heating chamber 17 is then energized, as by electric heating coils 18, and the cart 15 is introduced into and removed from the furnace, as on rails 15b, as by means of a pusher or pull bar 15a with the temperature being sufficient to cause the brazing metal 13 to flow along the underside of the carbide elements, and by pressure and capillary action, to also flow along the joints between adjoining carbide elements. After this melting and heating operation, the assembly is then permitted to cool, resulting in a complete composite metal member A, shown in FIGURE 6.

A composite member or product, such as A, may be used directly by securing it, as by brazing or welding it to a rotor wheel, such as shown in FIGURES 11, 13 and 14, but if it is to be used in an application such as shown in FIGURE 10, I contemplate providing it with a backing or back face layer. The backing layer may be provided by making-up a liquid cement, such as of sodium silicate or sodium silicate with fine powdered sand particles, and painting it or applying it on the exposed underside of the expanded metal member 11, so as to fill up the interstices or open portions therein. This layer 19 may then be permitted to solidify and may be heated to bake it and speed-up the solidification. I then soak a layer or piece 20 of a suitable woven fabric, such as nylon, in the cement solution and after it is saturated, apply it as indicated in FIGURE 7. The layer 20 is permitted to dry to produce a cement-hardened, backing, substantially smooth and uninterrupted, back face layer 20 which is bonded to the cement layer 19 to produce a product 25.

The advantage of the product construction 25 is illustrated particularly in FIGURE 10. The product 25 of FIGURES 8 and 9 is shown held between end stops 26 along the inside of a housing of a sandslinger apparatus 30. This apparatus comprises an impeller shaft 31, a drive cap 32, an impeller head 33, an impeller housing 34, and an impeller cup or tip 35 which projects from and is carried by a chuck 36 of the impeller head. Since the clearance spacing between the impeller tip 35 and the abrasion plate member 25 is somewhat critical, means is provided in the form of adjustment bolts or screws 27 for adjusting the clearance spacing therebetween and to make it uniform along the path of travel of the impeller tip 35. The hardened cement, impregnated fabric backing layer 20 thus serves as a solid, uninterrupted abutment face for the adjustment bolts 27.

In FIGURES 11 and 12, I have shown an abrading rotor wheel 40 that is adapted to be keyed on a drive shaft 41 at its hub 42, and which has a relatively flat face portion 43. A series of angle pieces 44, see also FIGURE 13, are welded or brazed in a radially-extending and circumferentially spaced relation across the face 43 to extend from the hub 42 to the outer periphery of the rotor. In this utilization, I have shown, see particularly FIGURE 11, a composite product or member, such as A of FIGURE 6, which may be brazed-on to cover the exposed portions of the face 43, as well as the inner face of the angle pieces 44, where the direction of rotation of the abrasive wheel is, for example, counter-clockwise of FIG- URE 11. Of course, in this utilization, the product A will be formed flat and of diagonal shape for positioning in the quadrants of 43 between the angle pieces 44, and the product A that is to be positioned along the angle pieces 44 will be formed of angle-shape.

Although as previously pointed out, I prefer to utilize thin brazing metal sheet material, the bonding of the three-ply metal members or layers of the package may also be effected by a conventional electric or gas-torch welding type of operation. The temperature employed in the metal joining operation, however, will be maintained substantially within the brazing range, in order to avoid damage, particularly to the intermediate or wire mesh layer. In other words, the brazing operation should be accomplished in such a manner as to retain the intermediate and backing metal members in an unmelted condition, such that they will substantially fully retain their initial individual characteristics for utilization in the final product, such as, for example, the tensile strength of the expanded or perforated backing metal member.

Since the exposed upper or outer carbide metal layer is made up of a group of relatively small-size, flat carbide metal pieces, this layer will conform to the arcuate, rounded or other desired shape, as represented by the intermediate and backing metal layers, by confirmation of joining edges or joints of the carbide metal pieces to such shape, and as secured together and filled-up with the brazing metal. Although any suitable heat-resistant strong cement may be used for closing-up the open portions or holes in the backing metal member, I have found that sodium silicate or so-called water glass containing powdered silicate particles is highly effective, and is not only resistant to a temperature increase incident to utilization of the product, but is strong and hard. As used with a backing fabric layer, it forms a good, continuous or smooth and substantially uninterrupted backing surface against which adjustment bolts may be used. In connection with the holding of the layers of the package under pressure in the desired shape during the melting of the brazing metal, such pressure can be applied mechanically or by the use of hand tools.

It will be apparent to those skilled in the art that the embodiments of my invention shown and described are merely representative and that the various modifications and changes may be made on the basis of my novel concept without departing from its spirit and scope.

What I claim is:

1. A method of bonding wear-resistant hard metal pieces such as carbide metal pieces together to provide a unitary metal construction having a wear-resistant surface which comprises, providinng a temperature-resistant unitary piece of ferrous metal screen of a size at least corresponding in direction to the desired dimension of the metal member construction to be produced, providing a plurality of substantially flat relatively brittle carbide metal pieces and placing them in an edge-abutting surface-aligned relation with each other on an exposed surface of said screen, and metal brazing the carbide metal pieces along their undersides in their supported relation to the screen while flowing the brazing metal into and filling up the joints between the carbide metal pieces.

2. A method as defined in claim 1 wherein, a strong backing metal member of expanded metal construction having openings therethrough in a spaced relation therealong is employed to support the screen along its underside, and the brazing metal is applied in such a manner as to braze the backing member to the screen and the carbide metal pieces.

3. A method as defined in claim 2 wherein a cement-impregnated strong fabric material is cemented on the underface of the backing metal member over the openings therethrough after the brazing operation to provide a continuous backing surface on the backing metal member.

4. A method of making a strong composite structure having a wear-resistant hard metal facing layer, an intermediate metal screen layer, and a supporting metal backing layer which comprises, placing a plurality of hard relatively brittle carbide metal pieces in a substantially edge-abutting relation with each other along one side of a unitary piece of high temperature flexible ferrous metal screen that has a size at least corresponding in dimension to substantially the desired dimensions of the composite structure to be produced, supporting the metal screen along its opposite side on a strong metal backing member of substantially the same dimension as said screen that has open portions therethrough along its extent and is of greater thickness than said screen to provide a three-layer package, and supporting the three-layer package with the layers in their defined positioning, while melting brazing metal between opposed sides of said carbide metal pieces and said screen and between opposed sides of said screen and said backing metal member and bonding the layers into a composite molecularly-adherent structure by cooling the brazing metal.

5. A method as defined in claim 4 wherein a layer of brazing metal in sheet form is placed between opposed sides of said carbide metal pieces and said screen before the melting operation.

6. A method as defined in claim 4 wherein the brazing metal is introduced in melted form through interstices of the screen and the open portions of the backing member.

7. A method of making a strong composite structure having a wear-resistant hard metal facing layer, an intermediate metal screen layer, and a supporting metal backing layer which comprises, placing a plurality of hard relatively brittle carbide metal pieces in a substantially edge-abutting relation with each other along one side of a unitary piece of high temperature flexible ferrous metal screen that has a size at least corresponding in dimension to substantially the desired dimensions of the composite structure to be produced, supporting the metal screen along its opposite side on a strong metal backing member of substantially the same dimension as said screen that has open portions therethrough along its extent and is of greater thickness than said screen to provide a three-layer package, shaping said backing metal member and said screen with said carbide metal pieces in position on said screen into a shaped relation corresponding to the desired shape of the composite product, and while supporting the layers in their shaped relation, melting brazing metal between the opposed sides of said carbide metal pieces and said screen and between opposed sides of said screen and said backing metal member, and cooling the package to provide a composite structure of the desired shape.

8. A method as defined in claim 7 wherein, at least one relatively thin layer of brazing metal is interposed between said carbide metal pieces and said metal screen, and the members of the package are held securely together while applying sufficient heat to the brazing metal layer to molecularly-bond the carbide metal pieces along their undersides to the metal screen and to the backing metal member, and effecting the brazing operation in such a manner as to fill up joints between adjacent edges of said carbide metal pieces with the brazing metal.

9. A method as defined in claim 7 wherein the brazing metal is solidified in a molecularly-bonded relation to fill up joints between the carbide metal pieces and to substantially fill up interstices of the metal screen.

10. A method as defined in claim 7 wherein the metal layers of the package are clamped in the desired shaped relation during the brazing operation and until the brazing metal solidifies.

11. A method as defined in claim 7 wherein, the brazing metal is applied in the form of a thin sheet layer between and along opposed faces of said carbide metal pieces and said metal screen, the layers of the package are securely-held under pressure in the desired shape while heat is applied thereto sufficient to melt the brazing metal and cause it to flow between adjacent edges of the carbide metal pieces, and the pressure is continued until the brazing metal has solidified.

12. A method as defined in claim 11 wherein the shaped layers of the package are subjected to electric induction heating to melt the brazing metal and molecularly bond the layers together into a composite structure.

13. A method of making a strong composite structure having a wear-resistant hard metal facing layer, an intermediate metal screen layer, and a supporting metal backing layer which comprises, providing an outer layer of a plurality of flat rectangular relatively brittle carbide metal pieces, providing an intermediate screen layer of high temperature metal in a supporting abutting relation along an underside of the carbide metal pieces of the facing layer, providing a backing metal layer of greater thickness and strength than said metal screen layer and which has spaced-apart openings therethrough, placing the backing metal layer in an abutting relation along the underside of the metal screen layer, holding the layers in their abutting relation with the carbide metal pieces of the facing layer in a substantially edge-abutting relation with each other, while applying brazing metal between opposed faces of the carbide metal facing layer and the metal screen layer and between opposed faces of metal screen layer and the metal backing layer, and forming a molecularly-bonded composite structure in which the adjacent edges of the pieces of the carbide metal layer are filled with the brazing metal.

14. A method as defined in claim 13 wherein, a heat-resistant cement is applied from the exposed side of said backing metal layer through the open portions therein upon exposed portions of the metal screen layer in such a manner as to at least partially fill up the open portions of the metal backing member, providing a strong fabric material of a requisite dimension for covering the exposed side of the backing metal member and impregnating it with the cement, applying the impregnated fabric material upon the exposed side of the backing metal layer and cementing it in position therealong in a bonding relation with the cement applied within the open portions of the backig metal layer.

15. A method as defined in claim 14 wherein, the cement introduced through the open portions of the backing metal layer is solidified before the application of the impregnated fabric material, and the cement of the impregnated fabric material is then solidified after the fabric material has been applied as a layer to the exposed side of the backing metal layer.

16. A method as defined in claim 15 wherein, the cement is applied to substantially fill the open portions of the metal backing member, and the fabric material is applied as a continuous substantially smooth surface layer along the exposed side of the backing metal layer.

17. A method as defined in claim 16 wherein the screen layer is of stainless steel, the metal backing layer is of carbon steel, the cement is a sodium silicate containing powdered silica, and the fabric material is of woven nylon.

References Cited
UNITED STATES PATENTS

| | | | |
|---|---|---|---|
| 1,254,558 | 1/1918 | Zeitler | 29—191.4 X |
| 1,376,304 | 4/1921 | Zeglen. | |
| 2,213,237 | 9/1940 | Brennan | 29—191.4 |
| 2,242,441 | 5/1941 | Shoemaker. | |
| 2,274,189 | 2/1942 | Congleton | 29—195 X |
| 2,371,754 | 3/1945 | Gillum | 29—471.3 X |
| 2,962,806 | 12/1960 | Stumbock | 29—195 |
| 3,270,412 | 9/1966 | Vordahl | 29—472.3 |
| 3,288,653 | 11/1966 | Holt | 29—191.4 X |
| 3,306,642 | 2/1967 | Arnold | 29—471.1 X |

JOHN F. CAMPBELL, *Primary Examiner.*

R. F. DROPKIN, *Assistant Examiner.*

UNITED STATES PATENT OFFICE
CERTIFICATE OF CORRECTION

Patent No. 3,345,734            October 10, 1967

John J. Sowko

It is hereby certified that error appears in the above numbered patent requiring correction and that the said Letters Patent should read as corrected below.

Column 4, line 25, for "facilties" read -- facilitates --; column 5, line 57, for "solids" read -- solid --; column 7, line 51, for "providinng" read -- providing --; line 53, for "direction" read -- dimension --; column 9, line 5, after "shaped" insert -- metal --.

Signed and sealed this 15th day of October 1968.

(SEAL)
Attest:

Edward M. Fletcher, Jr.            EDWARD J. BRENNER
Attesting Officer                Commissioner of Patents